July 25, 1961  A. NECTOUX  2,993,387
AUTOMATIC CONTROL DEVICES FOR MINE HOISTING MACHINERY
Filed Oct. 14, 1958  3 Sheets-Sheet 1

INVENTOR
ANDRE' NECTOUX
BY Cameron, Kerkam & Sutton
ATTORNEYS

July 25, 1961    A. NECTOUX    2,993,387
AUTOMATIC CONTROL DEVICES FOR MINE HOISTING MACHINERY
Filed Oct. 14, 1958    3 Sheets-Sheet 2

INVENTOR
ANDRÉ NECTOUX
BY Cameron, Kerkam & Sutton
ATTORNEYS

United States Patent Office 2,993,387
Patented July 25, 1961

2,993,387
AUTOMATIC CONTROL DEVICES FOR MINE HOISTING MACHINERY

André Nectoux, Le Creusot, France, assignor to Societe des Forges et Ateliers du Creusot, Paris, France, a company of France
Filed Oct. 14, 1958, Ser. No. 767,186
Claims priority, application France Oct. 18, 1957
2 Claims. (Cl. 74—701)

The present invention relates to automatic control devices for mine hoisting machinery, and concerns more particularly the devices for subjecting the electric control equipment to the movement of the cages for the purpose of automatically attaining the control of the speeds of rising and descending.

For this purpose devices have already been produced wherein the speed control is subject to the movements of the cages by the intermediary of a mechanism coupled to the shaft of the machine and comprising two shafts one or the other of which is selectively operated, depending on the sense of rotation of the machine, at the beginning of each period of deceleration and of acceleration to be effected, each of these shafts is coupled to an electrical control device comprising notably a rheostat controlling the speed and a potentiometer for adjustment.

The control devices forming the subject of the present invention comprise for both senses of rotation of the machine only a single electric control apparatus, and effect the service of the intermediary levels in the case of multiple-level machines.

According to the invention the single speed control apparatus is driven by a shaft coupled to the satellite carrier of a differential gearing the sun wheels of which are coupled each to one of two shafts having a temporary movement.

According to another feature of the invention one of the two selectively controlled shafts is driven, during the periods of deceleration and of acceleration to be established for the intermediate levels, by a differential mechanism which takes the place of drive dogs of the said shaft, one of the sun wheels thereof being geared to the said shaft and the other to the shaft of the machine, the satellite carrier of the differential gearing being locked during these periods by a brake put in operation by a level selector.

In the accompanying drawings an embodiment of the control device according to the invention is illustrated more or less diagrammatically, and will be described hereinafter, by way of example:

Figure 1:
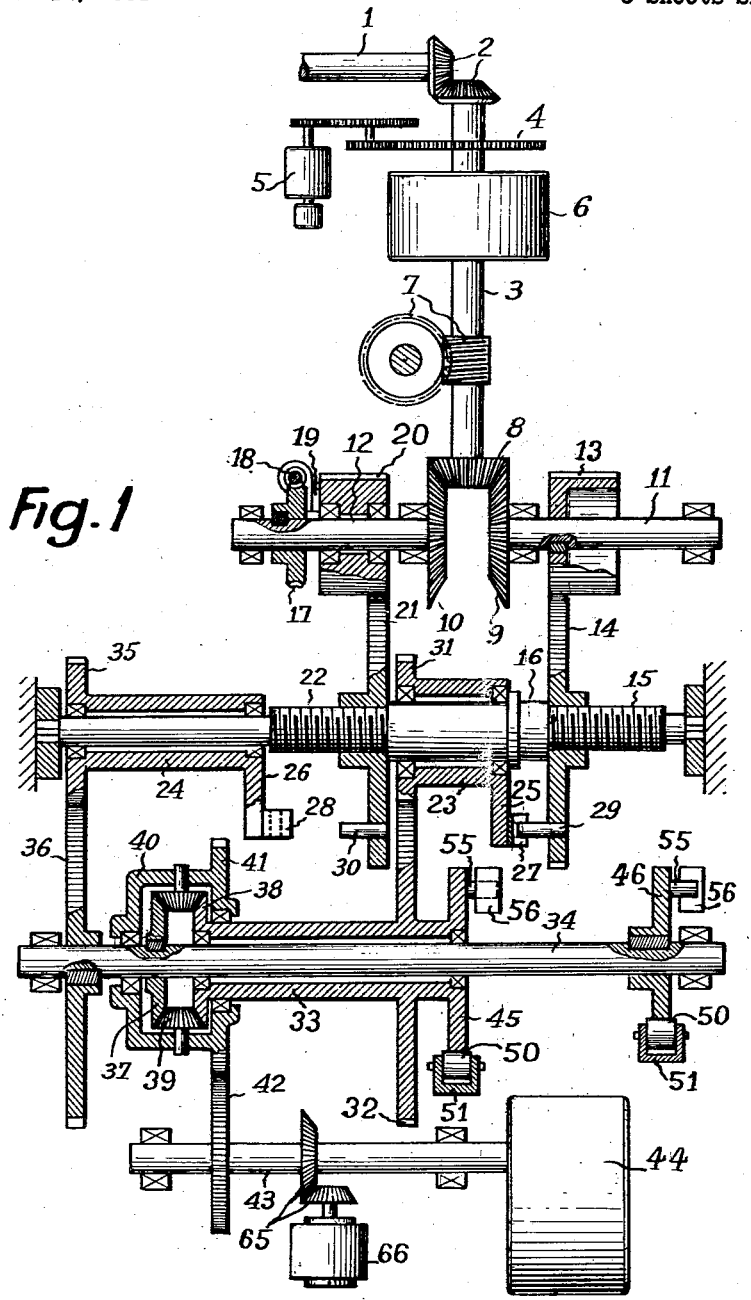
FIGURE 1 is a view of the general assembly of the device in the case of a two-level machine.

In FIGURE 1, 1 denotes the principal shaft of the machine which drives through bevel gearing 2 the input shaft 3 for the movements of the control mechanism. On the shaft 3 the drives for the usual indicator and corrector devices are mounted such as the drive 4 for the tachometer governor 5, for the cable slip corrector 6 and for the depth indicator 7.

The control mechanism is driven by the shaft 3 by the intermediary of a bevel pinion 8 in mesh with two bevel gears 9 and 10, keyed to the two shafts 11 and 12, respectively.

On the shaft 11 a spur gear pinion 13 is keyed which is in constant mesh with a spur gear 14 mounted on the threaded portion 15 of a fixed axle 16, while on the free end of the shaft 12 a worm wheel 17 is keyed which is in mesh with a worm 18 journalled in a bracket 19 integral with a spur gear pinion 20 mounted idly on the shaft 12 and constantly in mesh with a spur gear 21 mounted on the threaded portion 22 of the fixed axle 16. A hand wheel (not shown) mounted at the end of the worm 18 permits by manual operation to vary the angular offset between the shaft 12 and the pinion 20, in order to compensate the wear of the pads of the hoisting pulley.

On the fixed axle 16 two hollow shafts 23 and 24 are journalled, which are provided with arms 25 and 26, respectively, on which are mounted the abutments 27 and 28 respectively, designed to co-operate with the dogs 29 and 30 mounted on the spur gears 14 and 21.

Figure 2:
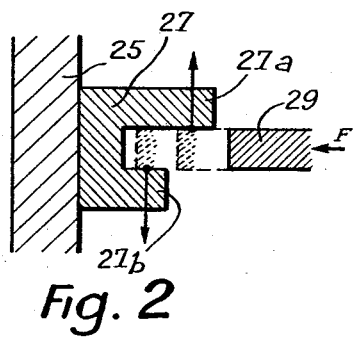
FIGURE 2 shows on a longer scale a dog drive of one of the two selectively driven shafts.

As shown in FIGURE 2, which is a development view on a larger scale, showing the relative movements of the dog 29 for example with respect to the abutment 27, the latter being constituted by a U having unequal legs 27a and 27b.

When the gear 14 carrying the dog 29 is driven in the sense which corresponds to its movement in the direction of the arrow F on the screw-threaded portion 15 of the axle 16, dog 29 effecting a helical movement comes at a certain movement in contact with the leg 27a of the abutment 27, carries along the hollow shaft 23 rotationally, and eventually engages itself between the two legs of the abutment. Upon rotation of the gear 14 in the opposite sense, the dog 29 carries along the abutment 27 and consequently the hollow shaft 23, up to the moment when the dog 29 releases the leg 27b.

The arrangement is identical as regards the drive of the hollow shaft 24 by the dog 30 co-operating with the abutment 28.

Thus the two hollow shafts 23 and 24 are driven, for each direction of movement, the one when setting the machine in motion and operating, if desired, a speed control rheostat during the acceleration period, while the other shaft, driven at the end of the winding operation, may operate a speed control rheostat during the deceleration period preceding the application of the brakes which is effected by conventional pit contacts located at the various levels in the mine shaft and actuated by movement of the cage, the brakes being applied to the main drive shaft or to the hoisting drum for the cage cable, all in known manner. The time interval between the end of the acceleration and the beginning of the deceleration corresponding to the normal running period of the machine is accordingly defined by the length of the threaded portions of the shaft 16 and of the helical pitch chosen for each of them.

One of the objects of the invention is to drive by the intermittent rotations of the two shafts 23 and 24 a single electrical control apparatus comprising a speed control rheostat, a potentiometer for adjustment, and an audible signal for a manually controlled running.

For this purpose the hollow shaft 23 is made integral with a spur gear pinion 31 in mesh with a spur gear 32 which is in turn integral with a hollow shaft mounted idly on a shaft 34. The hollow shaft 24 is integral with a spur gear pinion 35 in mesh with a spur gear 36 keyed to the shaft 34.

On the shaft 34 a sunwheel 37 of a differential gearing is keyed, the sun wheel 38 of which is integral with a hollow shaft 33, while the satellite pinions 39 are carried by the satellite carrier 40 of the differential gearing which is provided with a spur gear toothing 41 in mesh with a pinion 42 keyed to a shaft 43 for the control of an electric apparatus 44.

Figure 3:
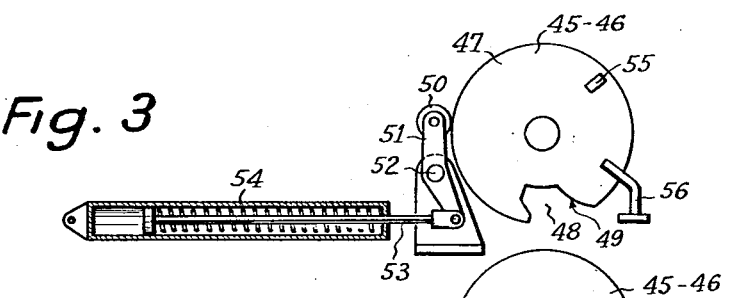
FIGURES 3 and 4 are end views showing the device for restoring one of the two selectively driven shafts at the end of the course, in two positions of operation.

The hollow shaft 33 is on the other hand integral with a cam 45, an identical cam 46 being keyed to the shaft 34. As shown in FIGURE 3 showing one of the cams 45 or 46 in end view, each cam has a cylindrical profile, interrupted by a recess 48 one end of which is constituted by a ramp 49 designed to come into contact with a roller 50 mounted at the end of a lever 51. This lever is pivoted in the middle about a fixed axle 52 and is articulated at its other end to a rod 53 subject to the bias of a spring 54 in the sense of applying the roller 50 to the ramp 49. A stop 55 integral with the cam is designed to co-operate with a fixed abutment 56.

Figure 4:
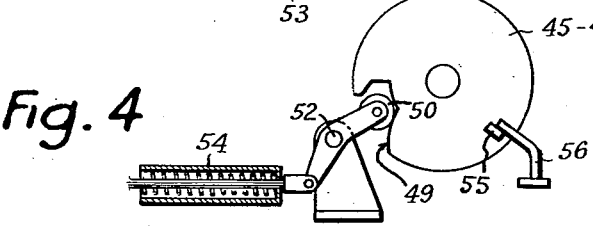

The functioning of the control device thus constituted, is as follows:

Assuming the position of the components illustrated in FIGURE 1 corresponds to the position of the cage at the "top landing." The dog 29 is then in contact with the abutment 27; the roller 50 of the cam 45 is applied by its associated spring 54 to the cylindrical periphery 47 of this cam, while the roller 50 of the cam 46 resting on the ramp 49 of this cam under the bias of its spring 54 tends to apply the stop 55 of this cam against the associated fixed abutment 56 (FIGURE 4).

When setting the machine in motion, the dog 29 carries along the abutment 27 of the hollow shaft 23, the rotational movement of which is transmitted to the sun wheel 38 of the differential gearing. The sun wheel 37 integral with the shaft 34 being restrained from rotating by the stop 55 of the cam 39, the satellites 39 drive the satellite carrier 40 of the differential gearing. This rotational movement is transmitted by the spur gears 41 and 42 to the shaft 43 driving the electric apparatus 44. When the driving of the shaft 43 by the dog 29 comes to an end, the roller 50 of the cam 45 leaves the periphery of this cam under the action of its spring 54, and dropping into the recess 48, acts on the ramp 49 so as to turn the cam 45 in the sense of its stop 55 abutting the associated fixed abutment 56. The electric apparatus 44 is thus carried along by the shaft 33, firstly under the action of the dog 29, then of the roller 50, into the end of acceleration position, and occupies the normal running position up to the moment when the dog 30 abuts the abutment 28 of the hollow shaft 24. The sun wheel 38 being then locked by the stop 55 of the cam 45, it is the sun wheel 37, which, driven by the shaft 34, makes the satellite carrier 40 of the differential gearing turn in the opposite sense, and with it the shaft 43, thereby provoking a deceleration. The roller 50 of the cam 46 has been applied, against the bias of the spring 54 and under the action of the ramp 49, to the periphery of this cam, which has partaken in the rotational movement of the shaft 34. At the suitable moment the braking manoeuvre is carried out by the usual pit contactor (not shown).

At the beginning of the subsequent winding, in which the shaft 3 of the machine turns in the opposite sense, the aforesaid manoeuvres take place in the inverse sequence, and it is the dog 30 which effects the rotation of the satellite carrier 40 of the differential gearing, and consequently of the shaft 43, in the sense of acceleration, while the dog 29 subsequently will control the beginning of the deceleration.

The control device described hereinabove relates to a hoisting machine for the service of a single level.

Figure 5:
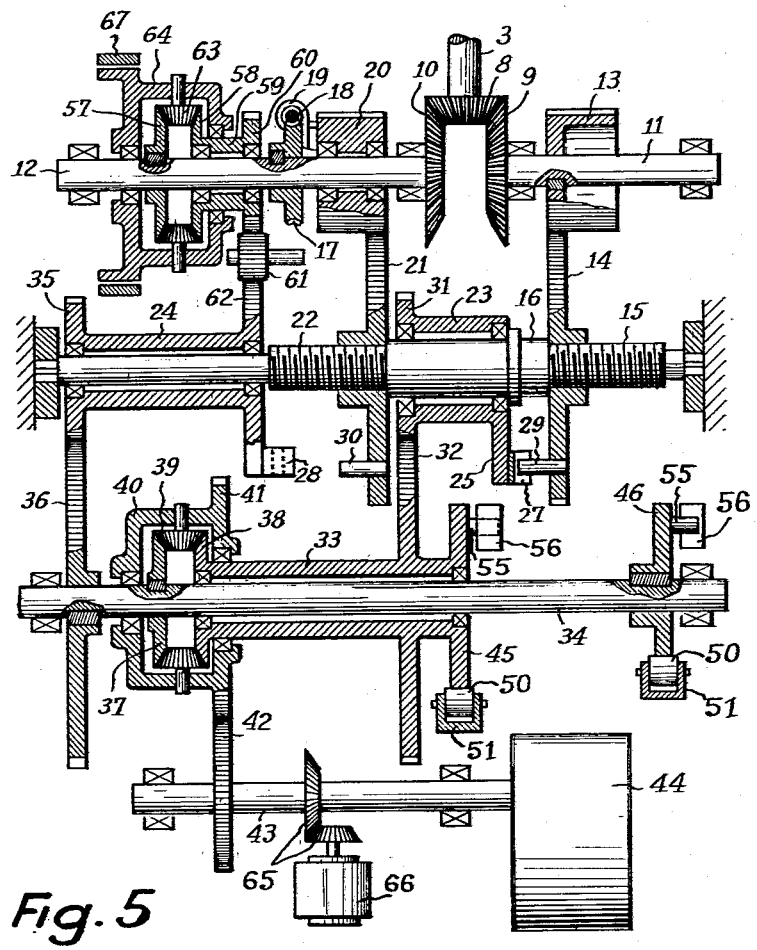
FIGURE 5 is a general assembly similar to that according to FIGURE 1, in the case of a multi-level machine.

The modification illustrated in FIGURE 5 concerns a control device comprising only a single electric apparatus for the movements of rising and descent, but allowing the servicing of multiple levels.

As shown in FIGURE 5, the shaft 12 is integral with a sun wheel 57 of a differential gearing, the other sun wheel 58 of which is integral with a hollow shaft 59 provided with another toothing 60 in mesh with pinion 61 which in turn meshes with a spur gear 62 integral with the hollow shaft 24 and carrying the abutment 28. The satellites 63 of the differential gearing are carried by the satellite carrier of the differential gearing 64 which constitutes the drum of an electromagnetic brake 67 preferably controlled by the level selector (not shown).

When the machine turns in the sense of the descent of the cage, the satellite carrier 64 of the differential turns freely since the shaft 34 is locked by the stop 55 of the cam 46. At the moment when the level selector causes the electromagntic brake 65 to be applied and consequently the satellite carrier 64 of the differential gearing to be locked, the hollow shaft 59 is driven by the sun wheel 58 in the opposite sense of the shaft 12, which has the effect of driving by the aid of the pinion 61, the hollow shaft 24, which by turning in the same sense as the gear 21 carrying the dog 30 effects the rotation of the shaft 34 in the sense of deceleration. When starting the machine in the opposite direction, the shaft 34 is driven in the sense of acceleration until the level selector has ceased to operate and the electromagnetic brake releases the satellite carrier 64 of the differential gearing.

Thus, the differential gearing mounted on the shaft 12 assumes, for the intermediate levels, the place of the dog 30 and abutment 28, which two components act, as described hereinabove, at the extreme landings.

It should be remarked that the decelerations upon approach of the extreme landings are attained by the dogs 29 and 30, independently of the level selector and of the differential gearing mounted on the shaft 12, and thus offers the maximum of security.

Well understood the control device described hereinabove could be modified in its details or supplemented by any suitable accessory member, without thereby leaving the scope of the present invention.

Thus the rotations of the shaft 43 may be used, by the intermediary of a pair of bevel gears 65, for controlling the indicator 66 of the approach to the landings. On the other hand, the pinions 32 and 36, or any components rotationally integral with these pinions, may comprise the abutments for the control of the usual winding pulley escapes (not shown).

What I claim is:

1. In an automatic control device for hoisting machinery for mine cages having a principal drive shaft, a speed control mechanism coupled to and subject to the movement of the drive shaft, said control mechanism comprising a pair of shafts, means for selectively driving from said drive shaft one of said shafts after the other, a differential gear assembly comprising a satellite carrier and a pair of sun gears rotatably mounted in said carrier, planet gears carried by said satellite carrier, said planet gears interposed between and in driving mesh with each of said sun gears and a speed control apparatus having an input shaft, said satellite carrier being coupled to said input shaft and each shaft of said pair of shafts being coupled to one of said sun gears.

2. In a control device as described in claim 1, a second differential gear assembly comprising a second satellite carrier and a second pair of sun gears rotatably mounted in said second satellite carrier, second planet gears carried by said second satellite carrier, said second planet gears interposed between and in driving mesh with each of said second sun gears, one of said second pair of sun gears being coupled to one shaft of said pair of shafts and the other of said second pair of sun gears being coupled to said principal drive shaft, and a brake for said second satellite carrier.

References Cited in the file of this patent

UNITED STATES PATENTS

| | | |
|---|---|---|
| 2,309,668 | Poorman | Feb. 2, 1943 |
| 2,384,044 | Poorman | Sept. 4, 1945 |